United States Patent [19]
House et al.

[11] Patent Number: 5,940,593
[45] Date of Patent: Aug. 17, 1999

[54] SIMULATING A MULTI-TIERED COMPUTER ENVIRONMENT ON A SINGLE DEVELOPMENT SYSTEM FOR DEBUGGING

[75] Inventors: Daniel Edward House, San Jose; Constance Jane Nelin, Monte Sereno, both of Calif.

[73] Assignee: International Business Machines Corporation, Armonk, N.Y.

[21] Appl. No.: 08/828,989

[22] Filed: Mar. 31, 1997

[51] Int. Cl.⁶ ...................................................... G06F 11/30
[52] U.S. Cl. ...................... 395/200.33; 395/704; 707/104
[58] Field of Search ........................ 395/200.33, 200.31, 395/704; 707/104

[56] References Cited

U.S. PATENT DOCUMENTS

| | | | |
|---|---|---|---|
| 4,972,367 | 11/1990 | Burke | 707/10 |
| 5,168,441 | 12/1992 | Onarheim et al. | 364/146 |
| 5,179,698 | 1/1993 | Bachman et al. | 707/4 |
| 5,193,182 | 3/1993 | Bachman et al. | 707/100 |
| 5,193,183 | 3/1993 | Bachman | 707/1 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |
| 5,548,724 | 8/1996 | Akizawa et al. | 395/200.03 |
| 5,548,726 | 8/1996 | Pettus | 395/200.09 |
| 5,708,780 | 1/1998 | Levergood et al. | 395/200.12 |
| 5,708,825 | 1/1998 | Sotomayor | 395/762 |
| 5,732,216 | 3/1998 | Logan et al. | 395/200.33 |
| 5,737,592 | 4/1998 | Nguyen et al. | 395/604 |

*Primary Examiner*—Krisna Lim
*Attorney, Agent, or Firm*—Merchant, Gould, Smith, Edell, Welter & Schmidt

[57] ABSTRACT

A method, apparatus, and article of manufacture for simulating a multi-tiered environment on a single computer. An application file is generated comprising second tier instructions invoking first tier instructions and third tier instructions. The application file is provided to the second and third tier runtime engines. The second tier instructions are executed in the second tier runtime engine. The third tier instructions are executed in the third tier runtime engine. A debugger on the first tier debugs the executed instructions.

9 Claims, 6 Drawing Sheets

SIMULATING A MULTI-TIERED COMPUTER ENVIRONMENT ON A SINGLE DEVELOPMENT SYSTEM FOR DEBUGGING

CROSS-REFERENCE TO RELATED APPLICATIONS

This application is related to the following co-pending and commonly-assigned patent applications:

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on Mar. 31, 1997, by Daniel E. House, Brian J. Owings, and Shiau-Shiau Pei;

Application Ser. No. 08/828,476, entitled "SHARED OBJECT MODEL," filed on Mar. 31, 1997, by Brian J. Owings, Shiau-Shiau Pei, and Daniel E. House;

Application Ser. No. 08/828,480, entitled "REMOTE SCRIPTING OF LOCAL OBJECTS," filed on Mar. 31, 1997, by Daniel E. House, Constance J. Nelin, and Rebecca B. Nin;

Application Ser. No. 08/828,478, entitled "MULTI-TIER VIEW PROJECT WINDOW," filed on Mar. 31, 1997, by Howard J. Glaser, Daniel E. House, and Constance J. Nelin;

Application Ser. No. 08/829,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot;

Application Ser. No. 08/828,846, entitled "SHARED MODULES GRAPHICAL USER INTERFACE," filed on Mar. 31, 1997, by Howard J. Glaser, Daniel E. House, and Constance J. Nelin;

Application Ser. No. 08/828,479, entitled "QUERY SELECTION FOR A PROGRAM DEVELOPMENT ENVIRONMENT," filed on Mar. 31, 1997, by Howard J. Glaser and Mary C. Lehner;

Application Ser. No. 08/828,477, entitled "DOCKING AND FLOATING MENU/TOOL BAR," filed on Mar. 31, 1997, by Howard J. Glaser, Stewart E. Nickolas, and Karl D. Johnson;

Application Ser. No. 08/828,890, entitled "HTML INTEGRATION UTILITY FOR A PROGRAM DEVELOPMENT ENVIRONMENT," filed on Mar. 31, 1997, by Howard J. Glaser;

Application Ser. No. 08/828,897, entitled "EXTENDER SMART GUIDE," filed on Mar. 31, 1997, by Howard J. Glaser;

Application Ser. No. 08/828,481, entitled "MULTI-TIER DEBUGGING," filed on Mar. 31, 1997, by Daniel E. House and Constance J. Nelin; and Application Ser. No. 08/828,990, entitled "DYNAMIC DISCOVERY OF CONTROLS," filed on Mar. 31, 1997, by Daniel E. House and Constance J. Nelin;

all of which applications are incorporated by reference herein.

BACKGROUND OF THE INVENTION

1. Field of the Invention

This invention relates in general to programming development environments performed by computers, and in particular, to a method and apparatus for remotely scripting local objects in a network server.

2. Description of Related Art

With the fast growing popularity of the Internet and Intranets, especially Web-based networks, there is also a fast growing demand for Internet and Intranet access to databases. Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO). Thus, there is a need in the art for methods of accessing RDBMS software across an Internet or Intranet, and especially via Web-based networks.

There is also a need for simplified development environments for such systems. For example, the internet server and the relational database management system usually reside on different computer platforms. This makes the development of software providing access to database management systems via the Internet difficult and time consuming. In particular, the fact that the software is developed with a single development computer, but eventually executed on multiple computers limits the effectiveness and completeness of debugging modules on the development computer.

SUMMARY OF THE INVENTION

To overcome the limitations in the prior art described above, and to overcome other limitations that will become apparent upon reading and understanding the present specification, the present invention discloses a method, apparatus, and article of manufacture for simulating a multi-tiered environment on a single computer.

The method comprises the steps of defining a first, second, and third tiers on the development computer, with the second and third tiers comprising a runtime engine, generating an APP file comprising second tier instructions invoking first tier instructions and third tier instructions, providing the APP file to the second tier runtime engine, and executing the second tier runtime instructions in the second tier runtime engine. The apparatus comprises a means for defining a first tier with a client browser implemented on a development computer, means for defining a second tier, implemented on the development computer, means for defining a third tier implemented on the development computer, a means for generating an APP file comprising second tier instructions invoking first tier instructions and third tier instructions, and a runtime engine, implemented on the second tier and the third tier, for executing the second tier instructions in the second tier and the third tier instructions in the third tier.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
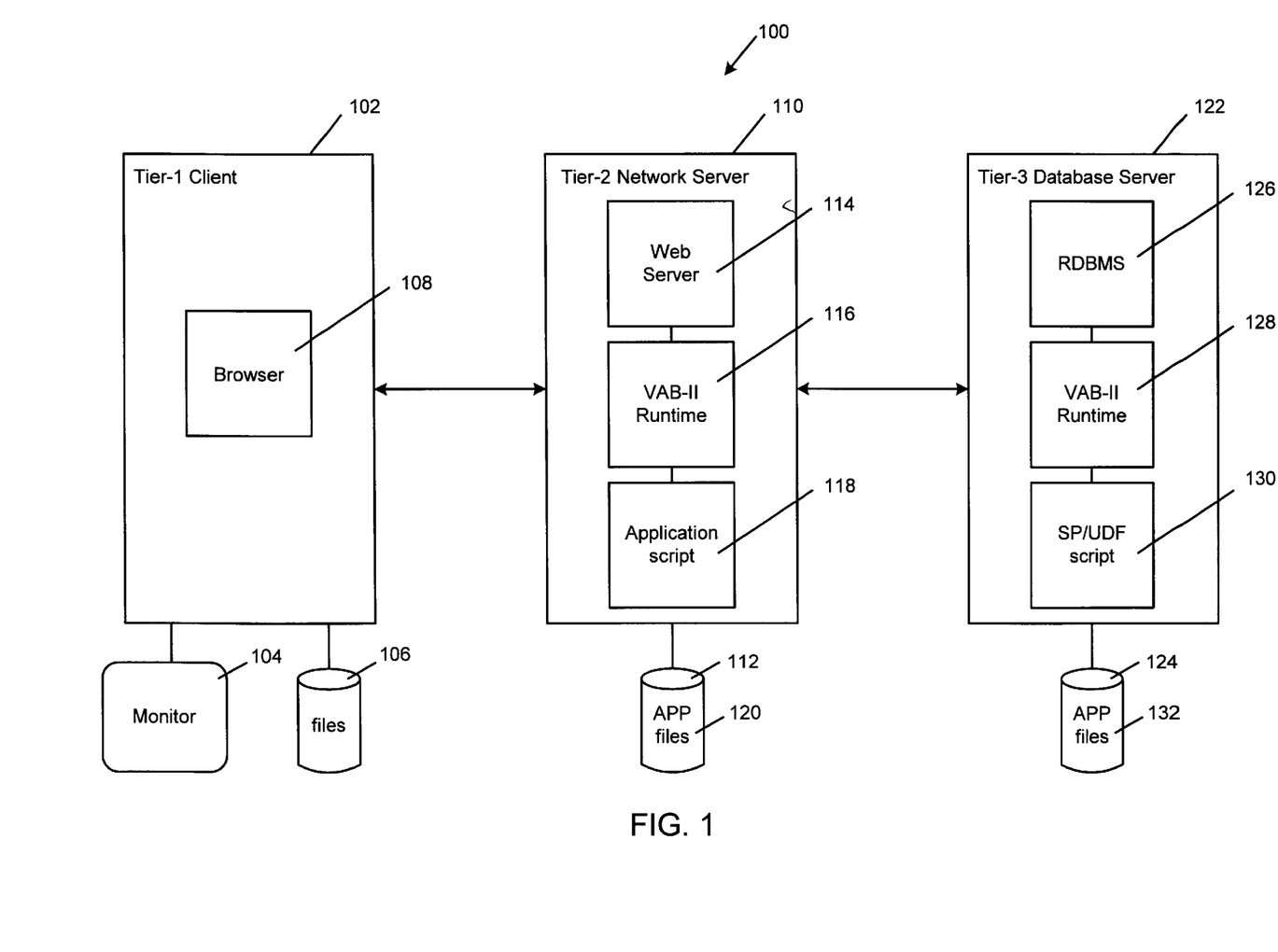
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests directly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
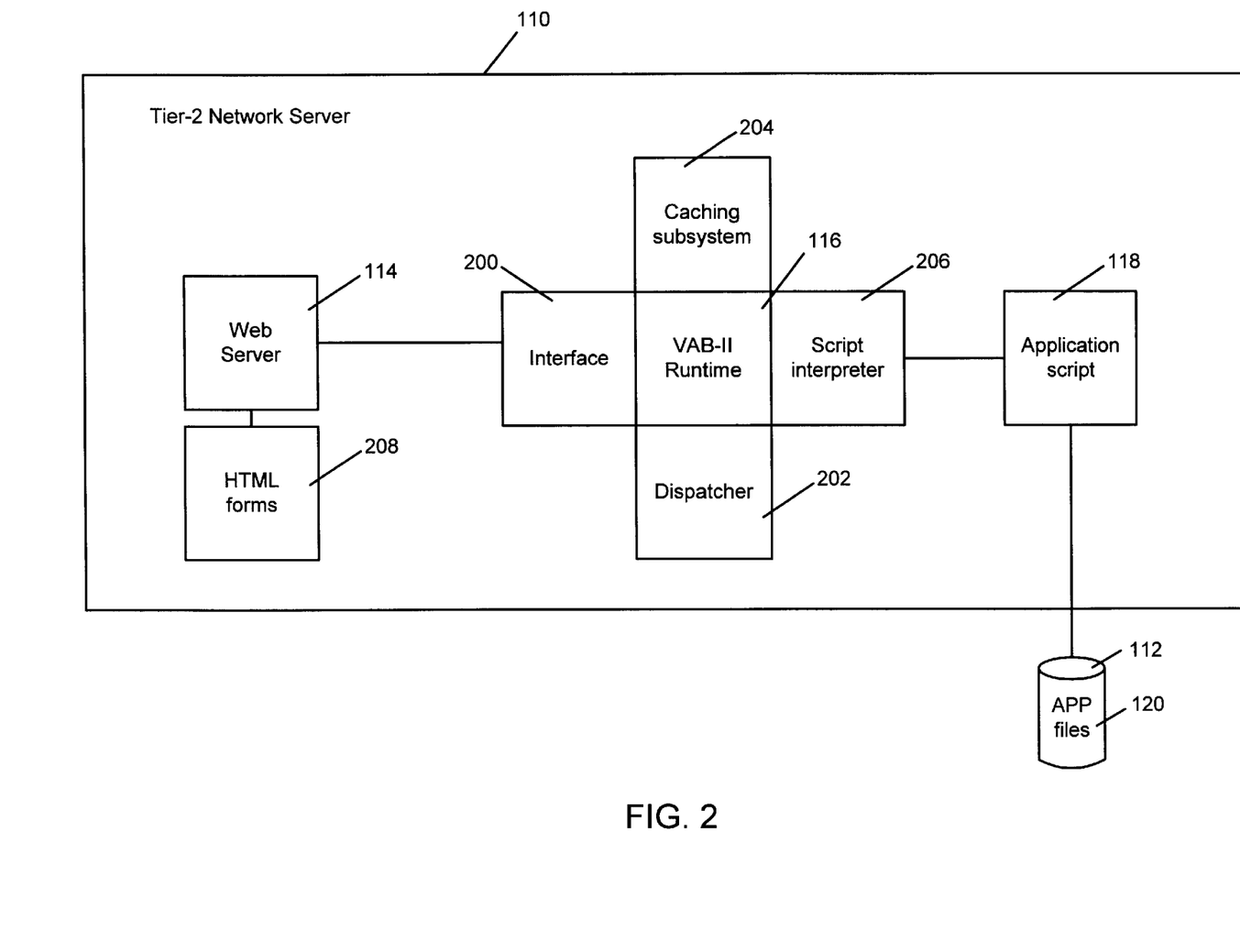
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112

Figure 3:
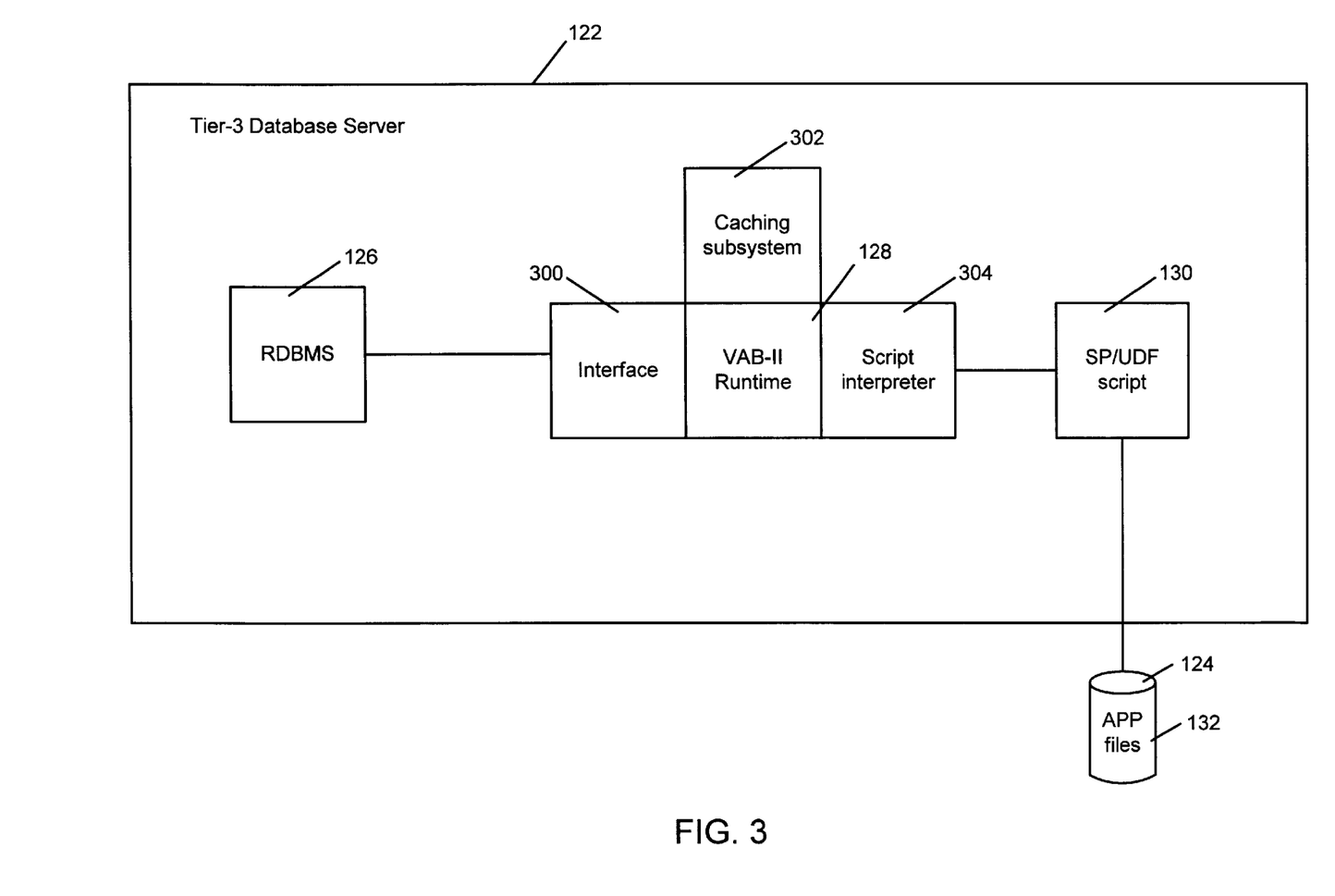
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
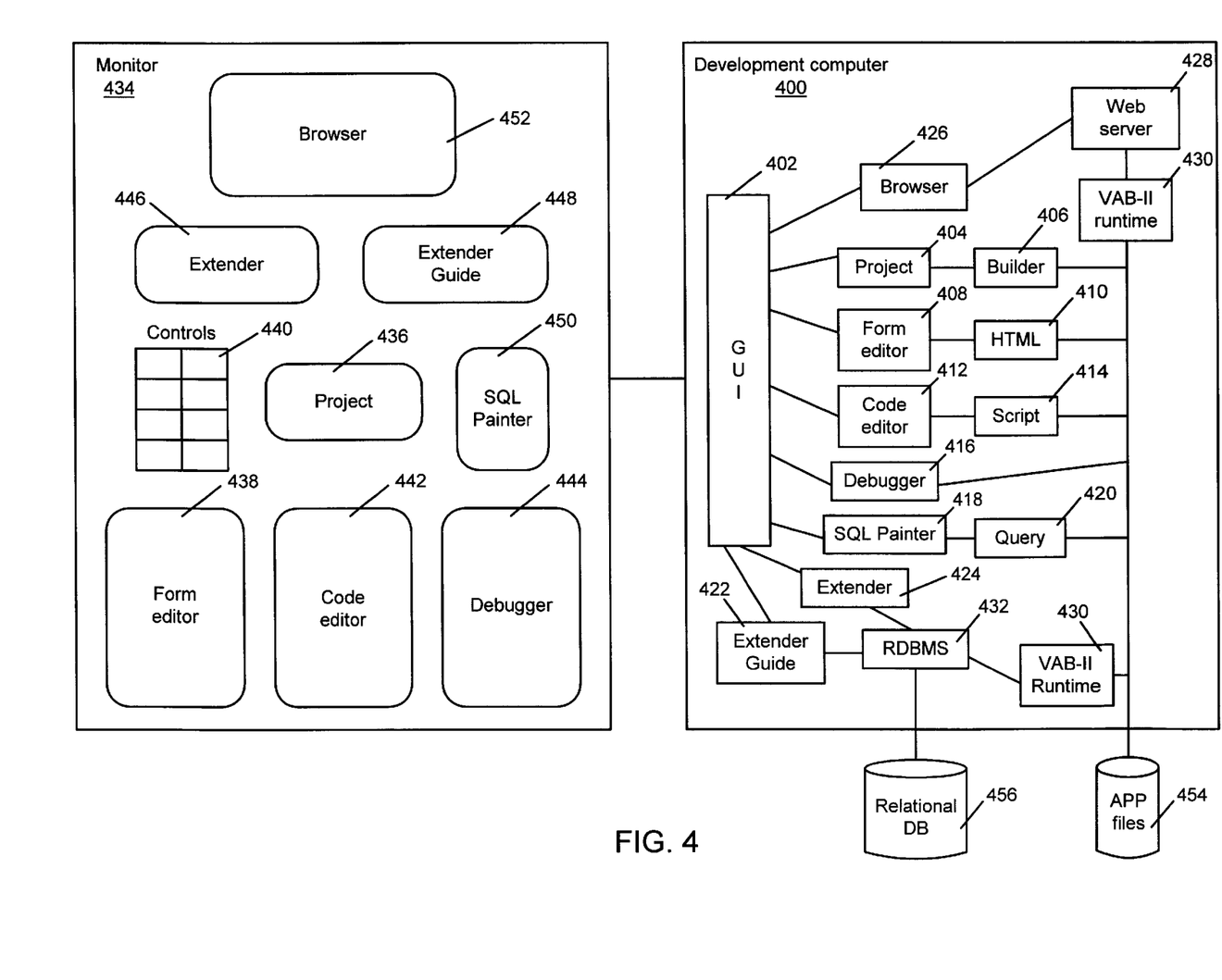
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Multi-Tier Debugging

Figure 5:
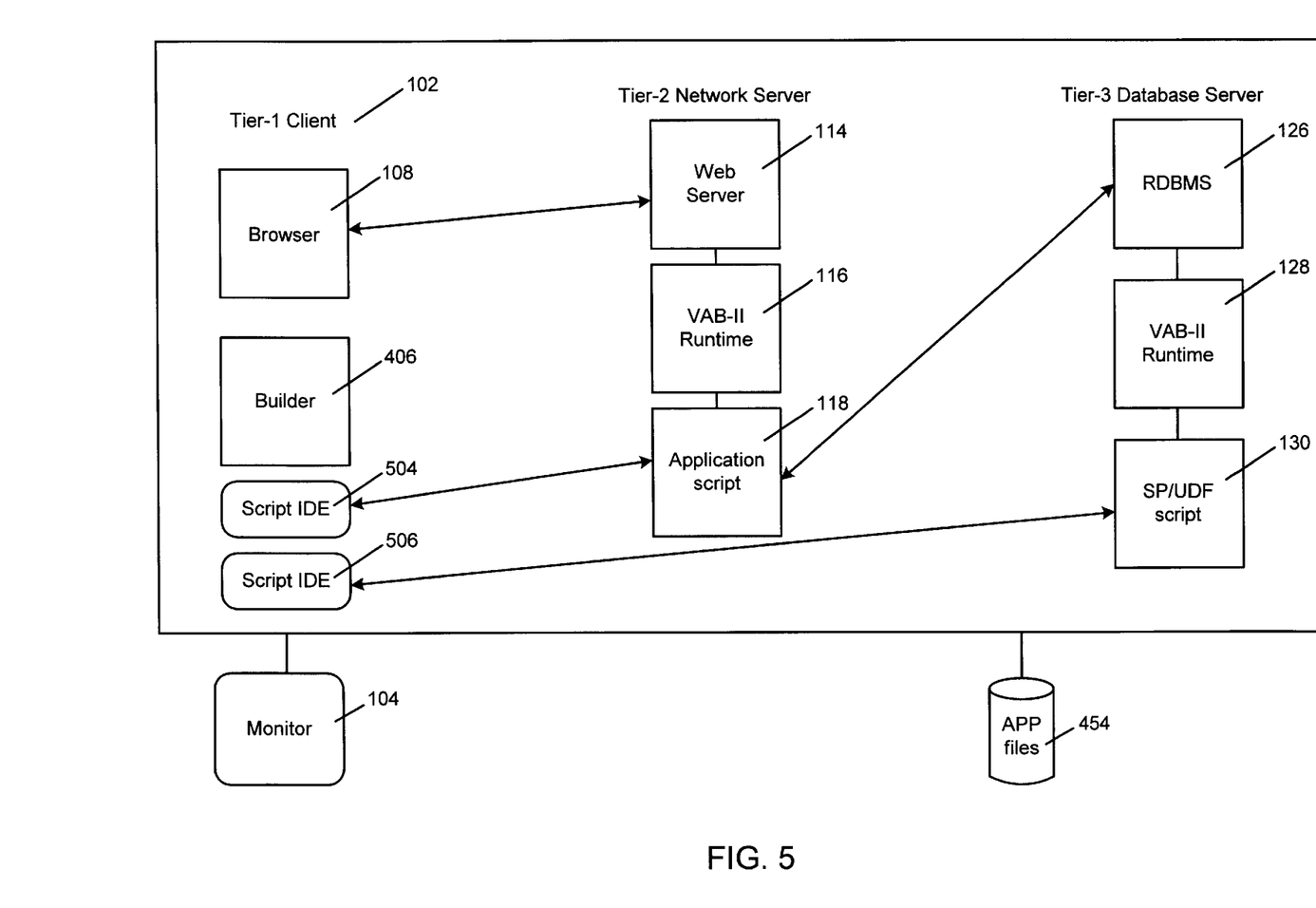
FIG. 5 is a block diagram that illustrates a multi-tier debugging tool provided by the development environment according to the present invention.

FIG. 5 is a block diagram that illustrates a multi-tier debugging tool provided by the development environment according to the present invention. The programming logic in the present invention runs in tier-2 110 (as an application script) and tier-3 (as an SP/UDF script), and is driven by the browser 102 in tier-1 102.

One or more LotusScript IDEs are executed, wherein each IDE includes a code window with a debugger. The IDEs support source level debugging, which allows users to set breakpoints and modify variables.

In the example of FIG. 5, an IDE code window 504 is opened onto the tier-2 application script 118, so that breakpoints can be set and variables modified. Similarly, an IDE code window 506 is opened onto the tier-3 SP/UDF script 130, so that breakpoints can be set and variables modified. As the user interacts with controls in the HTML form displayed by the browser 108, the application script 118 and SP/UDF script 130 are executed and breakpoints within the scripts are triggered.

The runtime and development time environments are intended to be as identical as possible. The same components are used and the same logic is driven. This enables the components to be designed and implemented once, rather than implemented multiple times. It also enables the developer to have very high confidence that the testing being done reflects the actual environment in which the application will eventually run when published on multiple tiers.

Debugging prior to production (i.e., prior to when the application has been published to servers) is virtually identical to debugging in production. The same logic and component structures are used. This enables developers to test code in the same environment in which it will run in production. It also enables common code on the different tiers.

Run Local/Run Remote

Figure 6:
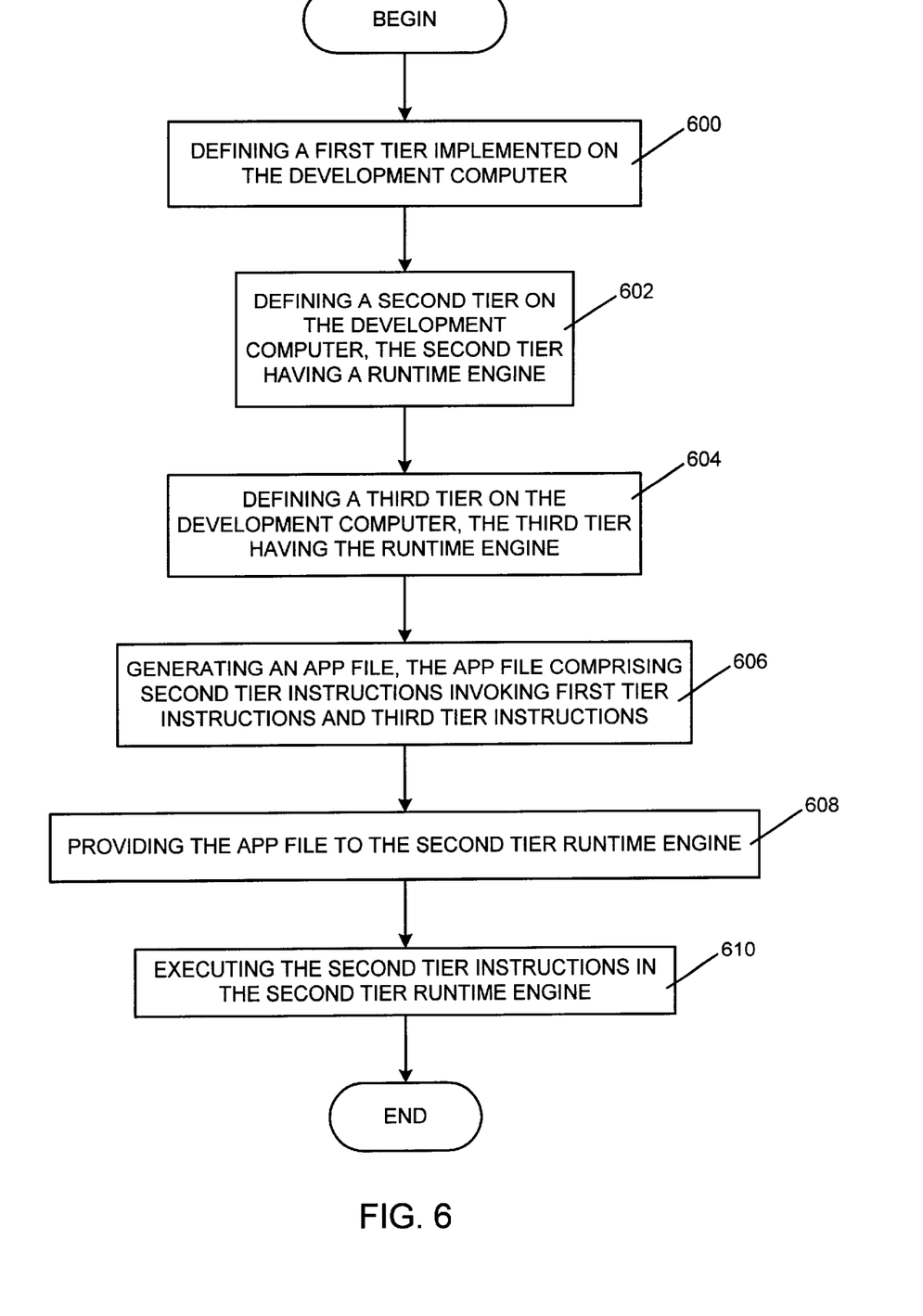
FIG. 6 is an flow chart illustrating the method steps of the present invention.

FIG. 6 presents the method steps employed in the present invention to support the "Run Local/Run Remote" function provided in the development environment.

"RunLocal" is the function selected to run the application on the local development machine (and prepare for debugging it). First, as earlier described, first, second, and third tiers are defined on the development computer 400. This is indicated by blocks 600–604, respectively. The first tier comprises a client browser 108, and both the second and third tiers comprise the VAB-II runtime engine 116, 128. This provides a common codebase, and allows application debugging of the LotusScript logic to be the same for both tiers. Next, as shown in block 606, the application is essentially "completed" by generating the appropriate APP file 120 and if necessary, HTML. Then, the APP file 120 and HTML is provided to the second tier VAB-II Runtime engine and stored under a directory in the representing this application where the local http daemon can serve it (to the local browser client 108). Because the application is "published" to the local machine in a place where the http daemon on the local development machine can "serve it", the local copy of the VAB-II runtime module 116 can execute the scripts of the application, and the Builder 406 and LotusScript IDE 504, 506 can debug the scripts of the application. This process is represented by block 610.

Similarly, "RunRemote" is the function selected to run the application on the remote network server (and prepare for debugging it). The "RunRemote" function executes the browser 108 and points it at the URL describing the first page of an application which has already been published on some server (if the application was not published using the project, the user must type this URL into the browser). Any special debugging parameters are inserted into the URL automatically. The major differences between RunRemote and simply running the application by typing in the URL in the browser 102 are: (1) the project window is displayed and (2) debug information is automatically inserted in the URL. These are preparations for debugging the application remotely. A code window under an IDE will appear and be ready to specify breakpoint and variable watches as soon as the tier-2 logic is invoked.

Likewise, a code editor window will appear and be ready to specify breakpoint and variable watch information as soon as tier-3 logic is invoked (if there are tier-3 SP/UDF's in this project). Both of these "automatic debug windows" are optional, but by default they will come up.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for simulating a multi-tiered environment on a single computer.

The method comprises the steps of defining a first, second, and third tiers on the development computer, with the second and third tiers comprising a runtime engine, generating an APP file comprising second tier instructions invoking first tier instructions and third tier instructions, providing the APP file to the second tier runtime engine, and executing the second tier runtime instructions in the second tier runtime engine. The apparatus comprises a means for defining a first tier with a client browser implemented on a development computer, means for defining a second tier, implemented on the development computer, means for defining a third tier implemented on the development computer, a means for generating an APP file comprising second tier instructions invoking first tier instructions and third tier instructions, and a runtime engine, implemented on the second tier and the third tier, for executing the second tier instructions in the second tier and the third tier instructions in the third tier.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of simulating a multi-tiered environment on a single development computer, comprising the steps of:
   generating an application file, the application file comprising second tier instructions for a second tier of the multi-tiered environment that invoke first tier instructions for a first tier of the multi-tiered environment and third tier instructions for a third tier of the multi-tiered environment;
   providing the application file to a second tier runtime engine on the second tier;
   executing the second tier instructions in the second tier runtime engine;
   executing the third tier instructions in a third tier runtime engine on the third tier; and
   debugging the executing second tier and third tier instructions from a debugger on the first tier.

2. The method of claim 1, further comprising the steps of generating an HTML file and providing the HTML file for use by the first tier, the HTML file being stored on the second tier.

3. The method of claim 2, wherein the first tier instructions display information in the HTML file on a client browser.

4. An apparatus for simulating a multi-tiered environment on a single development computer, comprising;
   an application generator for generating an application file, the application file comprising second tier instructions for a second tier of the multi-tiered environment that invoke first tier instructions for a first tier of the multi-tiered environment and third tier instructions for a third tier of the multi-tiered environment; and
   a runtime engine, implemented on the second tier and the third tier, for executing the second tier instructions in the second tier and third tier instructions in the third tier; and
   a debugger on the first tier for debugging the executing second tier and third tier instructions.

5. The apparatus of claim 4, further comprising means for generating an HTML file and providing the HTML file to the second tier runtime engine.

6. The apparatus of claim 4, further comprising
   means for publishing second tier instructions invoking third tier instructions; and
   means for performing first tier instructions to display information with a client browser.

7. An program storage device, readable by a computer having a processor, a memory and a data storage device, tangibly embodying one or more programs of instructions executable by the computer to perform method steps of simulating a multi-tiered environment on a single development computer, the method comprising the steps of:
   generating an application file, the application file comprising second tier instructions for a second tier of the multi-tiered environment that invokes first tier instructions for a first tier of the multi-tiered environment and third tier instructions for a third tier of the multi-tiered environment;
   providing the application file to a second tier runtime engine on the second tier;
   executing the second tier instructions in the second tier runtime engine;
   executing the third tier instructions in a third tier runtime engine on the third tier; and
   debugging the executing second tier and third tier instructions from a debugger on the first tier.

8. The program storage device of claim 7, wherein the method further comprises the steps of generating an HTML file and providing the HTML file to the second tier runtime engine.

9. The program storage device of claim 8, wherein the first tier instructions display information in the HTML file on a client browser.

* * * * *